INVENTOR.
PETER A. ARGENTIERI, HARRY DAMMHIRSCH
AND THOMAS L. DAY.
BY

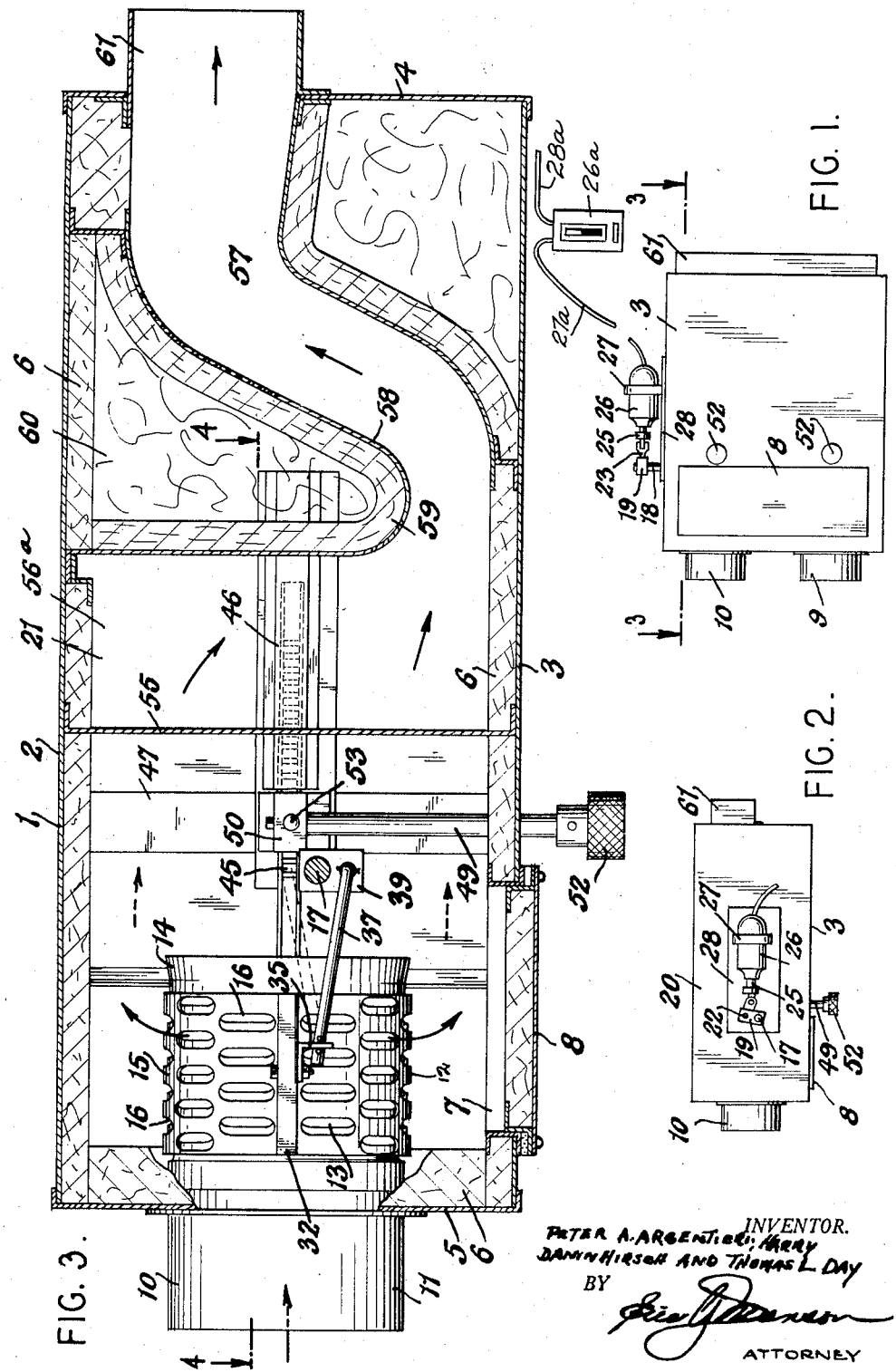

ATTORNEY

United States Patent Office 2,896,849
Patented July 28, 1959

2,896,849

AIR CONDITIONING APPARATUS HAVING CONTROLLED VOLUME AND TEMPERATURE AIR FLOW

Peter Argentieri and Harry Daninhirsch, Danbury, and Thomas L. Day, Bethel, Conn.

Application May 5, 1955, Serial No. 506,302

7 Claims. (Cl. 236—13)

This invention relates to air-conditioning apparatus and more particularly to a controlling means by which an air flow of desired temperature and required quantity can be caused to be directed from an outlet or duct.

It is an object of the present invention to provide means by which the temperature of an air flow emanating from an outlet can be automatically controlled, and it is another object of the invention to provide means by which the amount of air delivered can be regulated.

It is still another object of the invention to provide means by which quiet operation of the unit will be attained; regulation of proportional air volume will be effectively secured and the movable parts employed in the unit will be of simple construction and relatively few in number.

In one of its embodiments, the invention contemplates a unit in which an air inlet may consist of a pair of concentric, similarly-apertured cylinders or sleeves, with the outer cylinder of the pair axially slidable relative to the inner cylinder to thereby align the apertures in the outer cylinder with those in the inner cylinder or to partially or wholly disalign the two sets of apertures to thereby regulate the flow of air through said apertures. The invention further contemplates the provision of a disk or damper disposed within the inner or stationary cylinder, and with means by which said disk may be adjusted to control the total air delivery. The invention further contemplates the provision of a plurality of co-operating inlets constructed as above described, and with the movable cylinders thereof arranged to so move that one of them is acting to partially or wholly close off the apertures in the stationary cylinder which it encircles, while the second movable cylinder is acting to wholly or partially uncover the apertures in the stationary cylinder which it encircles.

It is a further object of the invention to provide an apparatus by means of which two separate means of dampering combined in a single location, is obtained. One of these methods consists in varying the number of holes in a cylinder by movement or adjustment of a disk or piston within the cylinder; the second method consisting in variance of the size of the holes by movement of an outer perforated sleeve relative to the cylinder. By this separation of the two dampering methods it is possible to obtain a controlled mixing of air streams from different ducts, as well as an independent volume adjustment of each air stream.

With these and other objects to be hereinafter set forth in view, we have devised the arrangement of parts to be described and more particularly set forth in the claims appended hereto.

In the accompanying drawings, wherein an illustrative embodiment of the invention is disclosed, Fig. 1 is a view looking at the bottom of the unit;

Fig. 2 is a side elevational view of the same;

Fig. 3 is a sectional view, taken substantially on the line 3—3 of Fig. 1, looking in the direction of the arrows;

Figure 4:
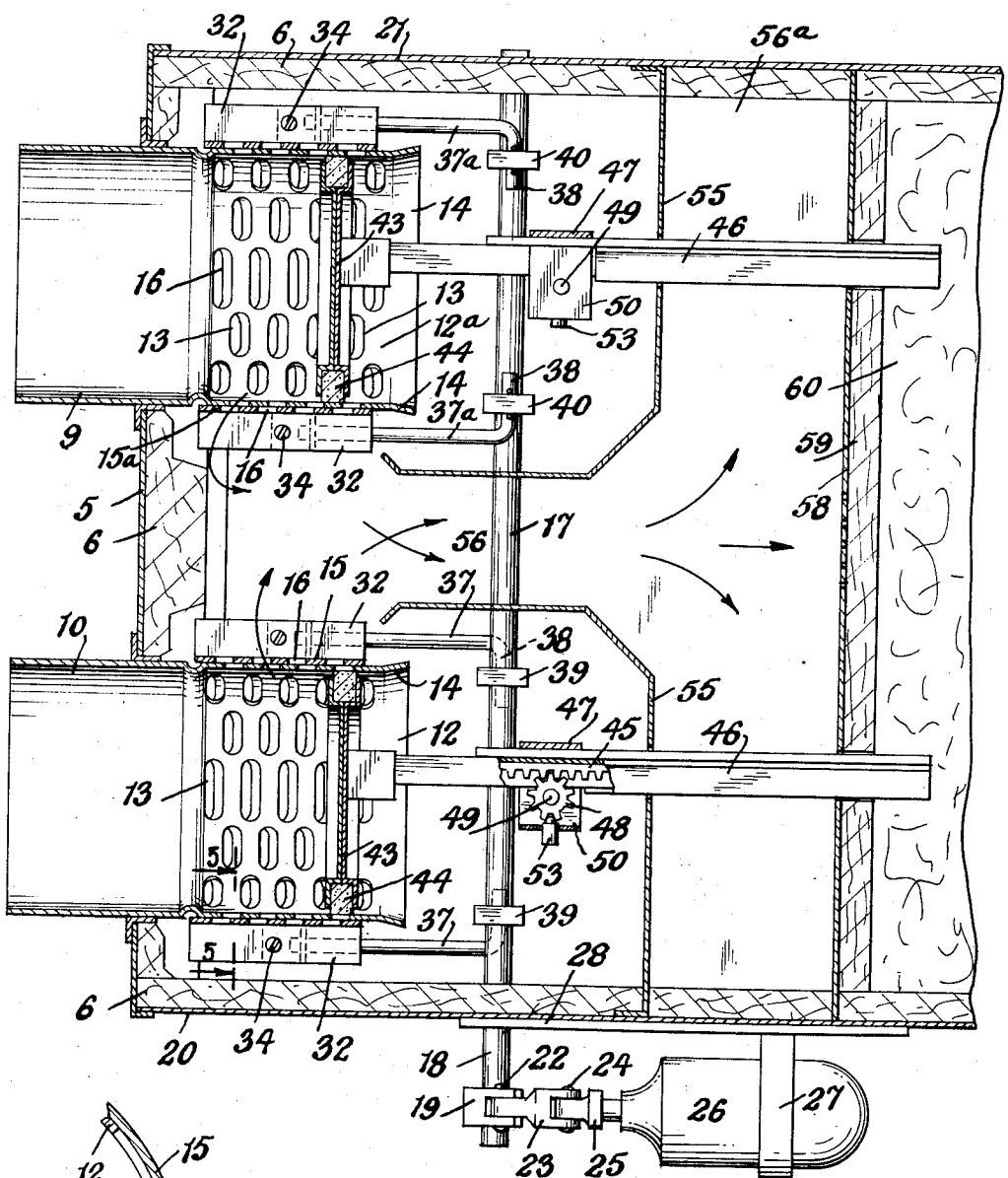
Fig. 4 is a sectional view, taken substantially on the line 4—4 of Fig. 3, looking in the direction of the arrows.

Referring to the drawings, 1 indicates generally the casing or housing of the air-controlling and regulating unit. The casing is preferably composed of sheet metal and it includes a top wall 2, a bottom wall 3, a front wall 4, a rear wall 5 and side walls 20 and 21. The casing, in the substantially rectangular form disclosed, has its inner wall surfaces lined with suitable sound-absorbing material or insulation indicated at 6. Provided in the lower wall 3 is an inspection opening 7, through which access to the interior of the housing 1 may be had for cleaning or adjustment, said opening being normally closed by the removable, insulation-lined cover member shown at 8.

Mounted in separate, spaced-apart relation in the rear wall 5 of the casing, and extending through said wall, is a pair of ducts or air inlets indicated respectively at 9 and 10, one of said inlets serving as a conduit for the passage of warm air and the other as a conduit for cool air, the flow of hot and cool air into the interior of the casing 1 being regulated and controlled in a manner to be described. The inlet 10 is in the form of a cylinder having a neck portion 11 located externally of the casing 1, and adapted for connection to a source of air. Said cylindrical inlet 10 also includes a portion indicated at 12 which is located wholly on the inside of the casing 1, and said portion 12 is formed with a plurality of similar apertures indicated at 13. The inner end or extremity of the apertured cylindrical part 12 is preferably slightly flared as indicated at 14.

Fitting closely, and in frictional contact therewith, and slidable on the ouside of the apertured cylindrical part 12 of the inlet 10 is a tube or sleeve 15, and which is axially slidable along on the outside of the apertured part 12. Said tube or sleeve 15 is provided with a plurality of apertures 16 which are substantially similar in size and shape to those shown at 13 and formed in the cylindrical part 12. By its slidable and axial movement relatively to the cylindrical part 12, the tube or sleeve 15 is adapted to have its apertures 16 wholly aligned with those shown at 13 or else partially or wholly disaligned with the same to thereby control the flow of air from the inlet 10 into the casing 1.

The sliding movement of the tube or sleeve 15 relatively to the cylinder 12 which it encircles, is effected by means of a rocking shaft 17 which is located within the casing 1 and extends between the two side walls 20 and 21 thereof and is journalled in said walls. The shaft 17 has an extended end portion 18 (Fig. 4) which is located externally of the side wall 20, and said end portion 18 carries a radial arm 19, pivotally connected at 22 to one end of a link 23 which has its opposite clevissed end pivotally connected at 24 to the piston rod 25 extending from a cylinder 26, constituting a motor and fastened by the strap 27 to a plate 28 secured to the wall 20 of the casing. The operation of the piston in cylinder 26 and which may be hydraulically operated, is controlled by known thermostatic means effective at the proper time and according to thermal requirements to rock the shaft 17 and thus move the tube or sleeve 15 backward or forward as required to control the amount of air flowing through aligned or partially-aligned apertures 16 and 13, or else completely disalign the two sets of apertures and thus completely shut off the flow of air into the casing 1. A thermostatic means for rocking shaft 17 is shown in Fig. 1, the same consisting of a proportioning thermostat 26a which varies the fluid pressure to cylinder 26 according to variation from the temperature setting, and which is connected by conduit 27a to the cylinder 26, the fluid supply tube to the thermostat being shown at 28a. The piston within the cylinder 26 is spring-urged in one direction and fluid-urged according to temperature variation, in the opposite direction, to thus move shaft 17 accordingly.

Figure 5:
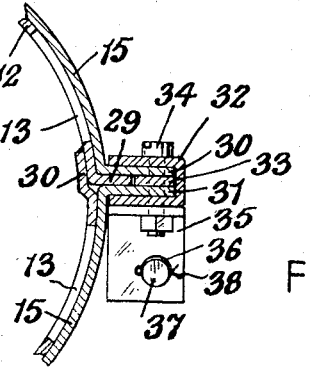
Fig. 5 is a sectional view, taken substantially on the line 5—5 of Fig. 4, looking in the direction of the arrows.

The cylindrical inlet 10 is composed of two semi-cylindrical halves joined at diametrically-opposite points, by overlapping and welding together of parts of the halves to produce the seam 30 shown in Fig. 5. It will therein be noted that the joined halves of the part 12 of the cylinder 10 are provided at diametrically-opposite points with lateral flanges 29, one of which is shown in Fig. 5. The sleeve 15 is also composed of two halves having the laterally-bent flanges 30 and 31 which are held in spaced relation by a spacing strip 33. The flange 29 fits between the flanges 30 and 31 on the halves of sleeve 15 and acts to support the sleeve 15 which is slidable along the flanges 29. A channel-strip 32 embraces the flanges 30 and 31 and the spacing strip 33. A bolt 34 extends through the channel-strip 32 and through flanges 30 and 31 and through the spacing strip 33, and said bolt 34 secures an angle bracket 35 to the under side of the channel-strip 32. In the vertical portion of the angle bracket 35 is provided a hole 36 through which one end of a push-rod 37 extends. Cotter pins 38 hold the rod 37 against sliding movement through the hole 36 in bracket 35.

At its opposite end, the rod 37 is laterally bent, as indicated at 38, and this bent end 38 of the rod is extended through a radial arm 39 secured on the rocking shaft 17 and extending downwardly therefrom. The description of the coupling means between the sleeve 15 and the rocking shaft 17 has thus far related to the elements which are located at one side of the sleeve. As will be apparent from Fig. 4, this construction is duplicated at the opposite side of the sleeve, so that the sleeve is engaged by two of the rods 37 at diametrically-opposite points and will be smoothly slid back and forth along the outside of the cylinder 12 when the rocking shaft 17 is rotatively moved by operation of the motor 26.

The means for moving the sleeve 15 along the outside of the cylinder 12 is duplicated on the inlet 9. Said inlet 9 has the perforated cylinder 12a located within the casing 1 and formed with the apertures 13 and flared end 14. On the outside of the cylinder 12a is a slidably-mounted sleeve 15a perforated or apertured as indicated at 16. The means for slidably mounting this sleeve is that shown in Fig. 5 and as heretofore described with respect to the tube 15. The rods 37a which couple the sleeve 15a to the rocking shaft 17 have their bent ends 38 extending through arms 40 secured on the shaft 17, and which arms extend upwardly from the shaft 17. This arrangement is such that when the shaft 17 is rocked, one of the sleeves 15 or 15a will be moved in one direction while the other of said sleeves will be moved in an opposite direction so that while the apertures in one of said sleeves will be moving toward a misaligned position in respect to those in the cylinder inside of it, the apertures in the other sleeve will be moving toward an aligned position in respect to those in its cylinder.

Located for axially slidable adjustment within each of the cylinders 12 and 12a is a disk member or damper 43 provided around its peripheral edge with felt 44 or other suitable packing material. Secured to each of the disks 43 is a toothed rack 45 which is longitudinally-slidable through a channelled housing 46 supported by a post or upright 47 extending between the top and bottom walls 2 and 3 of the casing. A pinion 48 is in mesh with the teeth of the rack 45, said pinion 48 being secured at the upper end of a control rod 49, rotative at one end in a bracket 50 supported by the post 47. Adjacent to its opposite end, the rod 49 is rotatively supported by the bottom wall 3 and it projects to the outside of said wall as seen in Fig. 3 and terminates in a knob 52 by which it can be manually rotated to thus adjust the position of the disk or damper 43 within the cylinder 12. A spring-pressed detent 53 mounted in bracket 50 engages the teeth of the pinion 48 and prevents inadvertent rotative movement of the same. It will be understood that the damper or disk 43 and its adjusting means as applied to one of the apertured cylinders is duplicated in the other cylinder, so that the two disks 43 are independently adjustable by the two knobs 52 seen at the bottom of the housing 1 in Fig. 1.

From the foregoing, the operation of the described structure will be readily understood. It will be seen that each of the inlet cylinders 9 and 10 is provided on its exterior with a perforated sleeve which is capable of axial adjustment with respect to its cylinder. This movement acts to vary the effective sizes of the apertures through which the air passes to enter into the casing 1. At one extreme position of the perforated sleeve with respect to the cylinder which it encircles, the apertures in both the cylinder and its encircling sleeve will coincide, thus producing the maximum aperture size for passage of the air into the casing. At the other extreme position, the imperforate area of the sleeve will block off the perforations in the cylinder, producing the effect of a solid, imperforate air inlet from which no air can pass. The arrangement by which the two sleeves 15 and 15a are moved is such that both of these sleeves are simultaneously moved in opposite directions so that the effective hole size through one cylinder is increased while that of the other is reduced. This controls the proportion of hot and cold air delivery into the casing and the final air temperature of the room.

The total air delivery is adjusted by means of the two discs or dampers 43 and this adjustment is manually and independently made by the manipulation of one or the other or both of the two knobs 52, which are available on the outside of the housing 1. The separate adjustment of the disks 43 enables the air delivery from the hot and cold inlets to be properly regulated against different static pressures in each inlet.

The air flow from the two inlets is indicated by the arrows in Fig. 4, wherein it will be noted that the inner end of each of the cylinders 12 and 12a is enclosed by a partition member or baffle 55 so that the air which flows out laterally from the apertures in the cylinders will mix in a central restricted passage 56 located between the partitions 55 to then spread out to fill the enlarged mixing chamber 56a contained within the casing 1. Leading from the mixing chamber 56a to the outside of the casing 1, is a sinuous or substantially S-shaped passage 57, said passage being lined with a foraminous material 58 backed by sound-absorbing material 59. Between the sound-absorbing material 59 and the walls of the casing 1 is provided fibrous insulating material 60. The outlet of the passage 57 is shown at 61 and the same may be connected to a suitable diffuser or other desired outlet for the air flow.

While we have herein mentioned the fact that the means for moving the sleeves 15 and 15a shall be operative to simultaneously move them in opposite directions, it will be apparent that the sleeves may, by relatively slight modifications in the mechanism disclosed, be caused to be moved either simultaneously or separately in the same direction. Also, while it is suggested that the movements of the sleeves 15 and 15a shall be thermostatically controlled, the adjustment of these sleeves may be manually made, with both sleeves being simultaneously adjusted or else being independently adjusted. We have also disclosed the disks 43 as being manually and independently regulated, but it will be apparent that these disks can if desired be operated simultaneously or separately, either manually or by thermostatically-controlled mechanism.

Having described a single embodiment of the invention, it is obvious that the same is not to be restricted thereto, but is broad enough to cover all structures coming within the scope of the annexed claims.

What we claim is:

1. In an apparatus of the character described, a casing having a wall, a pair of spaced air inlets entering through said wall, each of the air inlets including a perforated cylinder wholly located within the casing, a perforated sleeve slidably mounted on the outside of each cylinder and adapted by its movement on the same to align or partially or wholly disalign its perforations with those in the cylinder on which the sleeve is located, a rotatable shaft in the casing, connecting means between the shaft and the outer sleeves whereby a rotative movement of the shaft will cause the said outer sleeves to be simultaneously shifted on their respective cylinders, and temperature-controlled means for rotatively moving the shaft, an imperforate disk adjustable axially through each of said cylinders, and means located externally of the housing by which said disks are independently adjusted in each of the cylinders.

2. In an apparatus of the character described, a casing having a wall, a pair of air inlets leading through the wall and into the casing, each of said air inlets including a cylinder having a perforated portion located wholly within the casing, a perforated sleeve mounted for sliding movement on the outside of each of the cylinders and adapted by such movement to align or partially or wholly disalign its perforations with those in the sleeve on which the sleeve is located, a rotative member within the casing, means coupling said member to the sleeve in a manner to simultaneously move the sleeves on their respective cylinders, a disk slidably fitted within each of the cylinders and means located externally of the casing by which each of said disks are adjusted independently of one another.

3. In an apparatus of the character described, a casing, an air inlet in the form of a cylinder passing through a wall of the casing, said cylinder being provided with an apertured part located within the casing, a sleeve fitted over the outside of the apertured part of the cylinder and slidable thereon to thereby align or disalign its apertures with those in the cylinder, rods having one end in engagement with the sleeve, a rocking shaft within the casing, the second ends of the rods being pivotally and eccentrically connected to the rocking shaft, means located externally of the casing for automatically rocking the shaft according to thermal requirements, and a damper in the form of a disk contained within the apertured part of the cylinder and adjustable axially of the cylinder, said damper being manually adjustable by means located externally of the casing.

4. In an apparatus of the character described, a casing, a pair of cylindrical air inlets leading into the casing, each of said air inlets presenting an apertured part within the casing, a sleeve fitted around the outside of each of the apertured parts, each sleeve being apertured similarly to the apertured part which it embraces, means for simultaneously moving the sleeves over the apertured parts of the air inlets to thereby align or disalign the apertures in the sleeves with those in the inlets, the inlets being in spaced relation, baffle means in the casing to provide a constricted passage for air emanating from both inlets, an enlarged mixing chamber within the casing and with which the constricted passage communicates, and a sinuous outlet passage leading from the mixing chamber.

5. In an apparatus of the character described, a casing, a pair of cylinders leading into the same, the cylinders each having a part located within the casing and provided with a plurality of apertures, a sleeve on the outside of each cylinder, each sleeve being apertured to correspond to the cylinder which it embraces, a rocking shaft extending across the casing, links coupling said shaft to the sleeves in a manner to cause one of the sleeves to be moved when the shaft is rocked, a motor coupled to the rocking shaft to thereby rock the same at predetermined times, a disk in each of the cylinders within the apertured portion thereof, gear means connected to each disk for enabling each disk to be adjusted axially of the cylinder within which it is located, and manually manipulatable means located externally of the casing for adjusting the positions of the disks within the cylinders in which they are respectively located.

6. In an apparatus of the character described, a casing, a cylindrical air inlet extending through a wall of the casing and presenting a cylindrical portion on the interior of the casing, said portion being provided with a plurality of apertures in its wall, said portion having a pair of diametrically-opposite, radially-extending flanges, a sleeve fitted on the outside of the said apertured portion and conforming in shape thereto and slidable back and forth on said apertured portion, the sleeve having a plurality of apertures extending through it and adapted for alignment or disalignment with those in said apertured portion by said movements of the sleeve, the sleeve having diametrically-opposite flanges in slidable engagement with the flanges on the apertured portion, a rocking shaft having radially-projecting lugs, links connecting said lugs with the flanges on the sleeve whereby rocking movements of said shaft will slidably move the sleeve back and forth on the apertured portion of the cylinder, and means for rocking the shaft.

7. In an apparatus as provided for in claim 5, wherein the means for rocking the shaft is located externally of the casing, the said shaft being mounted for rocking movement in the walls of the casing, the apertures in the sleeve being similar in shape to those in the cylindrical apertured portion, and a damper slidably adjustable in said apertured cylindrical portion.

References Cited in the file of this patent

UNITED STATES PATENTS

| 48,969 | Mills | July 25, 1865 |
|---|---|---|
| 1,097,944 | Riley et al. | May 26, 1914 |
| 2,193,581 | Clokey | Mar. 12, 1940 |
| 2,241,302 | Gaskill | May 6, 1941 |
| 2,620,983 | Lyman | Dec. 9, 1952 |

FOREIGN PATENTS

| 253,317 | Great Britain | June 17, 1926 |
|---|---|---|
| 610,912 | Great Britain | Oct. 22, 1948 |
| 649,447 | Great Britain | Jan. 24, 1951 |